United States Patent [19]

McPhee et al.

[11] Patent Number: 5,382,042
[45] Date of Patent: Jan. 17, 1995

[54] TOWING DEVICE SUPPORT

[76] Inventors: Steven J. McPhee, 1415 Merry La., La Marque, Tex. 77568; Joan M. Earp, 224 W. Dryden, #111, Glendale, Calif. 91202

[21] Appl. No.: 152,407

[22] Filed: Nov. 15, 1993

[51] Int. Cl.6 .............................................. B60D 1/36
[52] U.S. Cl. .................... 280/477; 280/402; 280/493; 248/333
[58] Field of Search ............... 280/478.1, 479.2, 479.3, 280/402, 493, 477; 248/354.5, 354.6, 354.7, 354.1, 333, 334.1, 336

[56] References Cited

U.S. PATENT DOCUMENTS

| 1,665,817 | 4/1928 | Morton | 280/492 |
|---|---|---|---|
| 1,804,973 | 5/1931 | Duty | 280/477 |
| 2,210,008 | 8/1940 | Rodin | 280/493 |
| 2,212,480 | 8/1940 | Rodin | 280/493 |
| 2,470,242 | 5/1949 | Felsing | 254/166 |
| 2,904,348 | 9/1959 | Quastad | 280/477 |
| 2,916,301 | 12/1959 | Cushman | 280/402 |
| 3,421,780 | 1/1969 | Rimmey | 280/508 |
| 3,434,738 | 3/1969 | Campbell et al. | 280/477 |
| 3,480,247 | 11/1969 | Waner | 248/336 |
| 3,944,259 | 3/1976 | Miller | 280/475 |
| 4,482,166 | 11/1984 | Van Antwerp | 280/479 |
| 4,619,463 | 10/1986 | Weaver | 280/478.1 |
| 4,699,394 | 10/1987 | Laie | 280/493 |
| 5,009,445 | 4/1991 | Williams, Jr. | 280/477 |
| 5,009,446 | 4/1991 | Davis | 280/477 |

*Primary Examiner*—Kenneth R. Rice
*Assistant Examiner*—Kevin Hurley
*Attorney, Agent, or Firm*—Pravel, Hewitt, Kimball & Krieger

[57] ABSTRACT

A towing device support is disclosed. The invention features a telescoping assembly having an inner telescoping member slidably disposed within an outer telescoping member. The invention further comprises a latching arm which, in cooperation with a plurality of dimples formed upon an outer surface of the inner telescoping member, restricts the sliding movement of the outer telescoping member relative to the inner telescoping member in at least one direction. When a towing device, fitted with the invention, is lifted, the telescoping assembly contracts. When the lifting motion is stopped, the invention suspends the towing device in the air, facilitating alignment and hitching by one person.

11 Claims, 2 Drawing Sheets

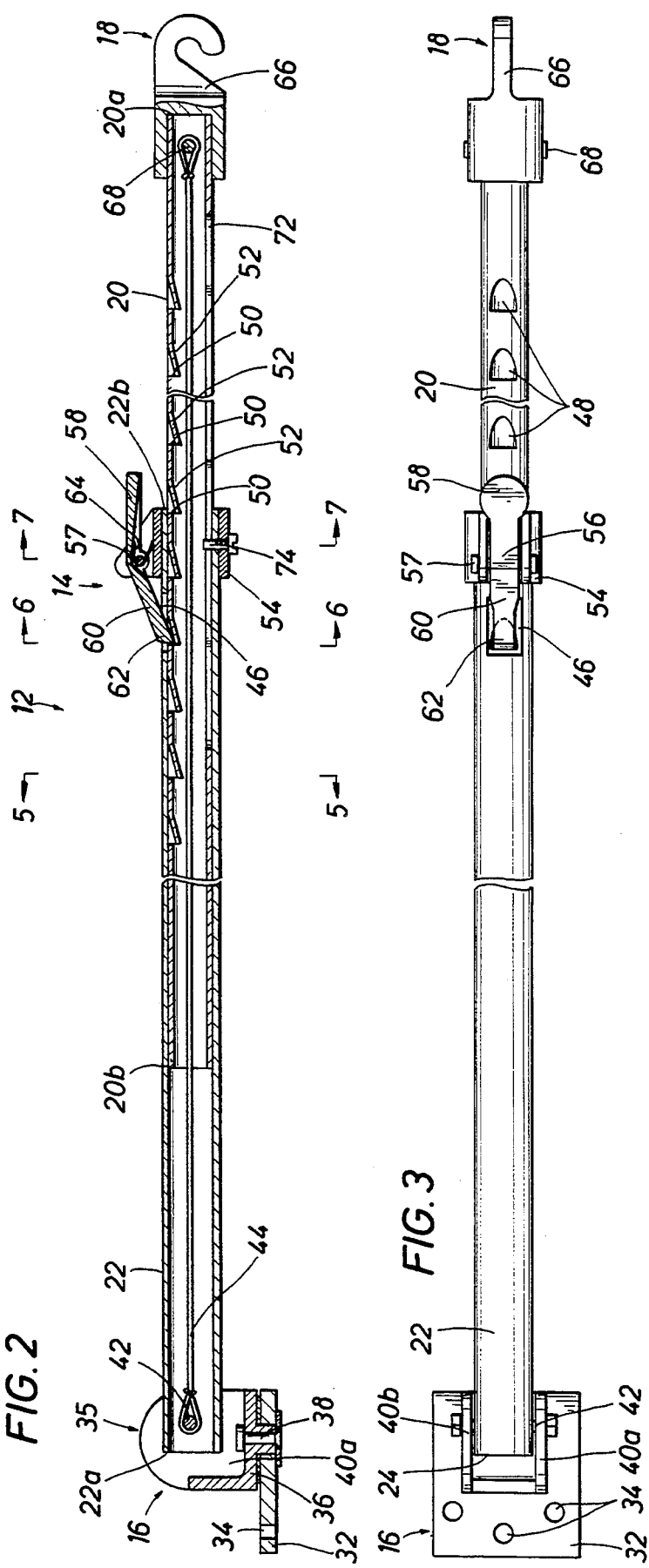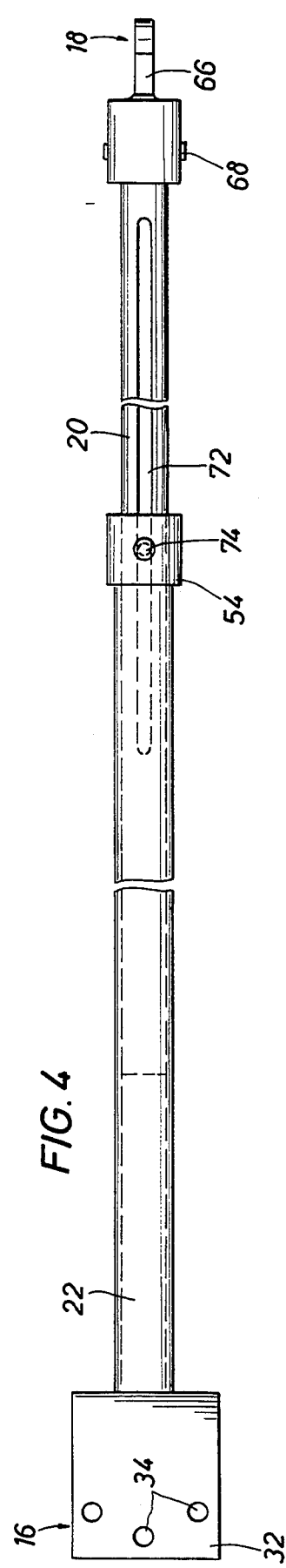
FIG. 2  FIG. 3  FIG. 4

TOWING DEVICE SUPPORT

BACKGROUND OF THE INVENTION

1. Field of the Invention

This invention relates to towing devices; specifically, it relates to a towing device support which facilitates the coupling of a towing device to a towing vehicle.

2. Description of the Related Art

This invention is used to assist persons who frequently tow passenger vehicles, trailers, and the like using A-frame (or other similar) tow bars employing ball-and-cup coupling mechanisms. A typical expected purchaser of this device would be one who regularly tows his passenger vehicle behind a recreational vehicle (or "RV") while on vacation.

The invention will be frequently used in conjunction with A-frame type towing devices, but it may well find application with other tow bars. In the case of the A-frame tow bar, the feet of the "A" are connected to the towed vehicle/object. At the tip or apex of the "A" is a cup. The cup is placed over the ball of a towing hitch mounted on the towing vehicle.

In installing the A-frame style tow bar, once the legs of the A-frame are attached to the passenger or other vehicle to be towed, the cup located at the tip of the A-frame must be lifted, positioned over the ball of the hitch on the RV or other towing vehicle, and then lowered onto the hitch. Currently, this is a job conveniently done by two persons (one holds up the tow bar; the other operates the passenger vehicle and eases it up to the RV hitch).

The related art discovered to date teaches about these and other towing/hitching devices themselves, and not about towing device supports. References in these patents to towing device supports are cursory references to hydraulic jacks (see, e.g., U.S. Pat. No. 3,434,738) and springs (see, e.g., U.S. Pat. Nos. 1,665,817; 1,804,973; 2,904,348; 3,421,780), and not to inventions of the type disclosed herein.

SUMMARY OF THE INVENTION

As stated above, aligning and hitching the A-frame has typically been a two-man job. The inventor has conceived a device which will make it easier for one person to do the job. The invention holds the tow bar up in the air, while the sole user moves the passenger car into position so that the cup of the A-frame is in position over the ball on the RV hitch. Then, with the press of a release button, the user may lower the cup onto the ball. For convenience, one end of the invention may be permanently mounted to the towing device, the other being clipped temporarily to one of the members of the tow bar for later use.

The towing device support comprises: a telescoping assembly; a securing means (also termed a latching means) for restricting the movement of said outer telescoping member relative to said inner telescoping member in at least one direction; and connecting means for securing the free ends of the telescoping assembly to the towing device and to the towed object.

The latching means is employed to restrict the movement of the outer telescoping member relative to the inner telescoping member. In the preferred embodiment, this securing means restricts movement in one direction; that is, it prevents expansion of the telescoping assembly, but permits contraction. Furthermore, in the preferred embodiment, a first biasing means (also termed a telescope biasing means), such as an elastic cord, urges contraction of the distance between the free ends of the telescoping assembly.

A first connecting means (also termed a tow device connecting means) secures the invention to the towing device (e.g., the A-frame). Once the tow device connecting means is in place, an actuating portion (i.e., a thumbgrip) of a securing arm is depressed, disengaging the securing arm. With the thumbgrip so depressed, the inner telescoping member may now be extended, against the moderate elastic force of the telescope biasing means, so as to hook a second connecting means (also termed a vehicle connecting means) to the towed vehicle. The user now releases the thumbgrip.

When the user now lifts the tip of the towing device from the ground, the outer and inner telescoping members, assisted by the elastic telescope biasing means, will contract. In so doing, a stopping portion of the securing arm will glide over stopping surfaces on the inner telescoping member. When the user has lifted the towing device to the desired height, he may now stop the lifting process and release the towing device. The invention suspends the towing device in this elevated position, because, as the force of gravity attempts to draw the device downward, the telescoping assembly is expanded, and the securing arm engages a stopping surface on the inner telescoping member.

The user may now move the object to be towed into position, so that the cup of the towing device is directly over the ball on the towing vehicle. The user now depresses the actuating portion (i.e., the thumbgrip) of the securing arm, allowing the telescoping assembly to expand, and allowing the cup of the towing device to be lowered onto the ball of the towing vehicle. The vehicle connecting means may now be unhooked from the towed vehicle, and the invention may be secured/clipped to one leg of the towing device for future use.

BRIEF DESCRIPTION OF THE DRAWINGS

FIG. 2 is a front (longitudinal cross-sectional) view of the invention;

FIG. 3 is a top view of the invention;

FIG. 4 is a bottom view of the invention;

DETAILED DESCRIPTION OF THE PREFERRED EMBODIMENT

Figure 1:
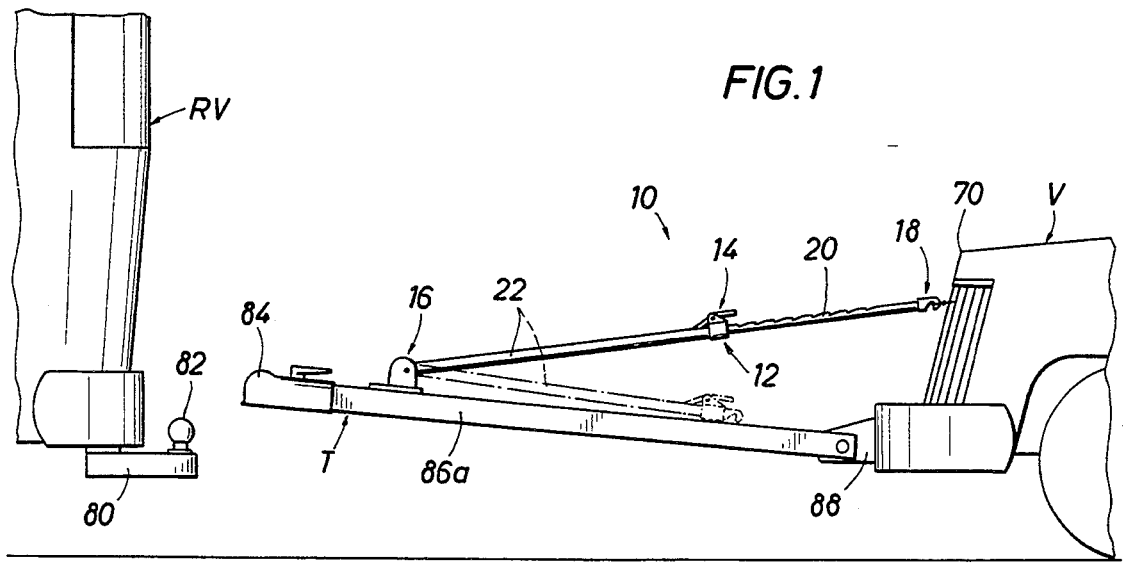
FIG. 1 is a front view of the invention, demonstrating a typical mode of operation.

Referring to the drawings and, in particular, to FIG. 1, a towing device support 10 is shown in its typical expected mode of operation in cooperation with a towing device T. The towing device T, an A-frame towing structure, comprises two legs 86a (shown) and 86b (not shown), a cup 84, and a towed vehicle connecting means 88. The towing device T operates in cooperation with a towing hitch 80 to which is attached a ball 82.

The towing device support 10 comprises: (a) a telescoping assembly 12 comprising an outer telescoping member 22 and an inner telescoping member 20; (b) a securing means 14 (also termed a latching means 14) for restricting the movement of said outer telescoping member 22 relative to said inner telescoping member 20 in at least one direction; and (c) connecting means 16 and 18 (discussed below) for securing the free ends of the telescoping assembly 12 to the towing device T and the towed vehicle V (to which the towing device T is secured).

Referring now to FIG. 2, the telescoping assembly 12 comprises an inner telescoping member 20 slidably disposed within an outer telescoping member 22. Both inner telescoping member 20 and outer telescoping member 22 are cylindrical, tubular members, but these members may be of other configurations, such as square tubes. The ends of the telescoping assembly 12 which are furtherest from one another are collectively termed the free ends, 20a and 22a. Thus, the end to be secured to the towing device T and the end to be secured to the towed vehicle V are the free ends. The other ends (the ends in telescoping engagement) are termed the engaged ends, 20b and 22b.

The free end associated with the outer telescoping member 22 is termed the outer free end 22a; the free end associated with the inner telescoping member 20 is termed the inner free end 20a. The engaged end associated with the outer telescoping member 22 is termed the outer engaged end 22b; the engaged end associated with the inner telescoping member 20 is termed the inner engaged end 20b.

A latching means 14 is employed to restrict the movement of the outer telescoping member 22 relative to the inner telescoping member 20. In the preferred embodiment, this latching means 14 restricts movement in one direction; that is, it prevents expansion of the telescoping assembly 12, but permits contraction.

A first connecting means 16 (also termed a tow device connecting means 16) connects the telescoping assembly 12 to the towing device T. A second connecting means 18 (also termed a vehicle connecting means 18) connects the telescoping assembly 12 to the towed vehicle V. The design of the telescoping assembly 12 is such that the manufacturer may use the tow device connecting means 16 to connect either the outer free end 22a or the inner free end 20a to the towing device T; the other free end would then be secured to the towed vehicle V by means of the vehicle connecting means 18. Note that in FIGS. 1, 2, 3, and 4 the tow device connecting means 16 connects the outer free end 22a to the towing device T.

Referring now to FIGS. 2 and 3, in the preferred embodiment, the tow device connecting means 16 comprises a plate 32, suitable for connection to said towing device T. The plate 32 has holes 34 which facilitate its attachment to the towing device T. If an A-frame style towing device T is employed, as shown in the drawings, the tow device connecting means 16 would be well-placed near the tip or apex of the "A" as shown in FIG. 1. Furthermore, for the convenience of the user, this connection may be of a permanent nature, permitting the body of the device 10 to be clipped to a leg 86a or 86b of the A-frame for further use, as is also shown in FIG. 1. The remainder of this discussion assumes that the plate 32 is attached to a horizontal portion of the towing device, although the invention would perform its function equally well "on its side" (i.e., with the plate 32 positioned in a vertical orientation).

Attached to the plate 32 of the tow device connecting means 16 is an endmount 35 comprising a baseplate 36 and two perpendicular flanges 40a and 40b, which are spaced apart to receive one free end of the telescoping assembly 12 (either the outer free end 22a or the inner free end 20a). The baseplate 36 is rotatably secured to said plate 32 by pin 38, so that the telescoping assembly 12 may be easily moved from side-to-side. The free end of the telescoping assembly 12 and the two perpendicular flanges 40a and 40b are rotatably connected by means of a pin 42, so that the telescoping assembly 12 may be easily moved in an up-and-down fashion. Thus, the tow device connecting means 16 connects one free end of the telescoping assembly 12 to the towing device T in such a way that movement of the telescoping assembly 12 from side-to-side and up-down is unimpaired.

Referring to FIG. 2, a first biasing means 44, or telescope biasing means 44, such as an elastic cord or spring, urges contraction of the distance between the outer free end 22a and the inner free end 20a. FIG. 2 illustrates the elastic cord 44, connected at its looped ends to pins 42 and 68, which urges contraction of the telescoping assembly 12.

Referring to FIGS. 2 and 3, the latching means 14 of the invention comprises an access hole 46 on said outer telescoping member 22; a plurality of dimples 48 formed upon the outer surface of said inner telescoping member 20; a midmount 54; and a securing arm 56 (also termed a latching arm 56).

The dimples 48 on the outer surface of the inner telescoping member 20 are aligned along the longitudinal axis of the member. These dimples 48 feature a stopping surface 50 and a sliding surface 52, thus forming a ratcheting surface.

The midmount 54 is attached to the outer surface of said outer telescoping member 22 in close proximity to the access hole 46.

The latching arm or latch 56 is rotatably mounted upon the midmount 54 by means of a pin 57, and includes an actuating portion 58 and a stopping portion 60. The actuating portion 58 is commonly referred to as a "thumbgrip." FIG. 3 graphically demonstrates that, when thumbgrip 58 is released, the stopping portion 60 may be pivoted into direct engagement with the stopping surface 50 of the dimples 48 through the access hole 46 on the outer telescoping member 22.

Figure 5:
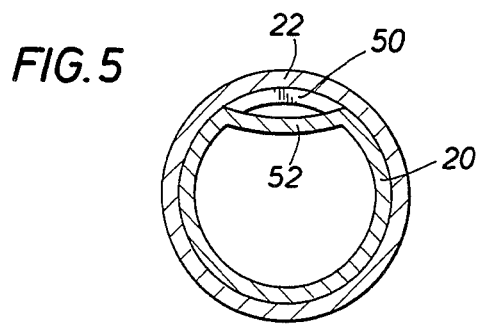
FIG. 5 is a side cross-sectional view of the invention, taken along the plane of line 5—5.
Figures 6, 7:
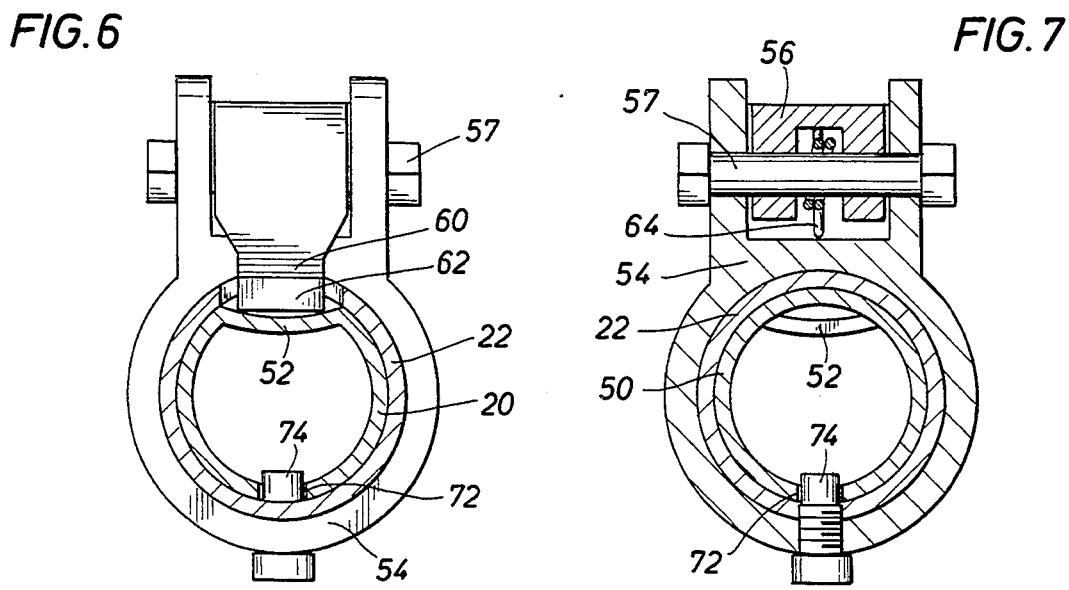
FIG. 6 is a side cross-sectional view of the invention, taken along the plane of line 6—6.
FIG. 7 is a side cross-sectional view of the invention, taken along the plane of line 7—7.

FIGS. 2, 5, and 6 further demonstrate the geometry of the dimples 48 and of the stopping portion 60 of the latching arm 56 operating in cooperation. Note that, in this preferred embodiment, the tooth 62 of the stopping portion 60 will prevent attempted expansion of the telescoping assembly 12, because it will engage with one of the dimples 48 at the stopping surface 50. However, contraction of the telescoping assembly 12 will be permitted, because the tooth 62 of the stopping portion 60 will glide over the stopping surface 50 of the dimple 48.

Referring to FIG. 7, the latching arm 56 will operate more conveniently and reliably if its position is secured via a second biasing means 64, also termed a latch biasing means 64 or spring 64. This latch biasing means or spring 64 constantly urges the stopping portion 60 of the latching arm 56 into engagement with the stopping surfaces 50 of the dimples 48, as is further disclosed in FIG. 2.

Referring to FIG. 1, to attach the telescoping assembly 12 to the towed vehicle V, a vehicle connecting means 18 is employed. In the preferred embodiment, this vehicle connecting means 18 comprises a connecting hook 66. Referring to FIG. 2, the connecting hook 66 is connected to the telescoping assembly 12 by means of a pin 68, connecting it to either the outer free end 22a or the inner free end 20a. Note that in FIGS. 1, 2, 3, and 4, the vehicle connecting means 18 connects the inner free end 20a to the towed vehicle V. The connecting hook 66 hooks the towed object V directly. In the alternative, it may hook a small loop of wire 70, of sufficient strength, connected to the towed object V.

Referring again to FIGS. 1, 2, and 3, once the tow device connecting means 16 is in place, operation of the towing device support 10 is as follows. The actuating portion 58 (i.e., the thumbgrip) of the latching arm 56 is depressed, so that the stopping portion 60 is pivoted out of engagement with the dimples 48 on the inner telescoping member 20. With the thumbgrip 58 so depressed, the inner telescoping member 20 may be extended, against the moderate elastic force of the telescope biasing means 44, so as to hook the vehicle connecting means 18 to the towed object V. The user now releases the thumbgrip 58.

When the user now lifts the tip of the towing device T from the ground, the outer telescoping member 22 and the inner telescoping member 20, assisted by the elastic cord 44, will contract. In so doing, the stopping portion 60 of the latching arm 56 will glide over the stopping surfaces 50 of the dimples 48 on the inner telescoping member 20. When the user has lifted the towing device T to the desired height, he may now stop the lifting process and release the towing device T. The invention suspends the towing device T in this elevated position. This is specifically illustrated in FIG. 1. This suspension occurs because, as the force of gravity attempts to draw the device downward, the telescoping assembly 12 is expanded, and the stopping portion 60 of the latching arm 56 engages the stopping surface 50 of one of the dimples 48 on the inner telescoping member 20.

The user may now move the towed object V into position, so that the cup 84 of the towing device T is directly over the ball 82 on the hitch 80 on the towing vehicle RV. The user now depresses the actuating portion 58 (i.e., the thumbgrip) of the latching arm 56, allowing the telescoping assembly 12 to expand, and allowing the cup 84 of the towing device T to be lowered onto the ball 82 of the towing vehicle RV. The vehicle connecting means 18 may now be unhooked from the towed object V, and the invention may be secured/clipped to one leg 86a or 86b of the towing device T for future use by any suitable clip member (not shown), as is disclosed in FIG. 1.

It will be noted that the telescoping members of the preferred embodiment, displayed in the drawings, are cylindrical. In such an embodiment, it is desirable to prevent rotation of the outer telescoping member 22, relative to the inner telescoping member 20, because otherwise the stopping surfaces 50 of the dimples 48 on the inner telescoping member 20 may not be sufficiently aligned with the stopping portion 60 of the latching arm 56. Although this can be prevented by manual adjustment of the telescoping members, repeated turns of the telescoping members, relative to one another, could undermine the performance of the elastic telescope biasing means 44, which urges contraction of the telescoping assembly 12.

Referring now to FIG. 4, one way of preventing rotation of the outer telescoping member 22, relative to the inner telescoping member 20, is to fit the inner telescoping member 20 with an elongated slot 72. In the preferred embodiment, the slot 72 is positioned opposite the dimples 48 on the inner telescoping member 20 (see FIGS. 6 and 7), and, like the dimples 48, it runs parallel to the longitudinal axis of the inner telescoping member 20. The slot 72 may constitute a hole (as demonstrated in FIGS. 6 and 7) in the inner telescoping member 20, or it may merely constitute a channel (not shown), or groove, on the outside surface of the inner telescoping member 20. A pin 74 is fixed to the outer telescoping member 22 and protrudes into an interior cavity thereof, as is particularly disclosed in FIGS. 2, 6, and 7. The inner telescoping member 20 is radially positioned so that the pin 74 is positioned within the slot 72, as is particularly disclosed in FIGS. 4, 6, and 7. In this way, radial rotation of the outer telescoping member 22, relative to the inner telescoping member 20, is prohibited.

This pin-and-slot mechanism lends itself to solving another problem: inadvertent separation of the telescoping members. In this case, the pin-and-slot mechanism acts as a stopping means to prevent such inadvertent separation. The key is to ensure that the slot 72 on the inner telescoping member 20 doesn't run the entire length of the member, but, rather, stops short of the inner engaged end 20b, as is disclosed in FIG. 4. If the user should inadvertently attempt to expand the telescoping members to the point of separation, the pin 74 will collide with the end of the slot 72, preventing the separation.

Finally, it should be noted that the position of the latching arm 56 and midmount 54, relative to the access hole 46, can be reversed, yielding another embodiment (not shown). In this embodiment, the stopping portion 60 of the latching arm 56 engages the dimples 48 from the other side. The only change required is that the stopping portion 60 of the latching arm 56 must be fitted with a hook (not shown), instead of a tooth 62, to engage the stopping surface 50 of the dimples 48 on the inner telescoping member 20.

It should also be noted that the latching means 14 of the preferred embodiment may be designed so as to prevent relative movement of the telescoping members in both directions, "locking in" the position of each telescoping member relative to the other.

Use of this alternative latching means 14 yields an invention which may be easier to manufacture, albeit less convenient to use. In this embodiment, the outer telescoping member 22 features an access hole 46, and the inner telescoping member 20 features a plurality of securing holes (not shown), linearly aligned along the longitudinal axis of the member. The latching means 14 comprises a midmount 54, attached to the outer surface of said outer telescoping member 22, and a latching arm 56, rotatably mounted upon said midmount 54.

As before, the latching arm 56 comprises an actuating portion 58 and a stopping portion 60, wherein the stopping portion 60 directly engages the securing holes through the access hole 46, preventing expansion or contraction of the distance between the free ends of the telescoping assembly 12. The position of each telescoping member, relative to the other, is "locked in", when the stopping portion 60 of the latching arm 56, in this case a pin, engages one of the securing holes on the inner telescoping member 20 through the access hole 46 on the outer telescoping member 22. As before, a latch biasing means 64 (e.g., a spring) can be employed to good effect to encourage direct engagement of the stopping portion 60 of the latching arm 56 with the securing holes.

This embodiment of the invention works exactly as the preceding one. The only difference in operation is one of convenience. The use of an elastic cord 44 to assist in lifting the towing device T and contracting the telescoping members, the use of cylindrical telescoping members, the use of the pin-and-slot mechanism to prevent rotation of and inadvertent separation of the telescoping members, and the use of the first and second connecting means are all available to and recommended in the design of a device incorporating this embodiment.

Although the preferred embodiment and best mode for practicing this invention have been disclosed, it is to be understood that the invention is not limited thereto. For a fuller understanding of the scope of the invention, reference should be made to the following claims.

What is claimed is:

1. A towing device support adapted to be attached to a towing device connected to an object to be towed, for supporting the towing device during alignment of said towing device with a hitch on a towing vehicle, said towing device support comprising:
   (a) a telescoping assembly comprising an inner telescoping member slidably disposed within an outer telescoping member to provide a slidable connection therebetween, said inner telescoping member having an inner free end and an inner engaged end, said outer telescoping member having an outer free end and an outer engaged end, said slidable connection between said inner free end and said outer free end defining a distance between said inner free end and said outer free end which can be varied;
   (b) securing means for restricting the sliding movement of said inner telescoping member relative to said outer telescoping member so that expansion of the distance between said inner free end and said outer free end is prevented and contraction is permitted;
   (c) first connecting means for connecting one of said free ends of said telescoping assembly to a towing device and second connecting means for securing the other of said free ends to an object to which said towing device is secured; and
   (d) releasing means for releasing said securing means to allow expansion of the distance between said outer free end of said outer telescoping member and said inner free end of said inner telescoping member once said towing device is aligned with a hitch on a towing vehicle.

2. The towing device support of claim 1 wherein said second connecting means comprises a connecting hook, secured to one of said free ends of said telescoping assembly.

3. The towing device support of claim 1 further comprising a first biasing means for urging contraction of the distance between said outer free end and said inner free end.

4. The towing device support of claim 1 wherein said outer telescoping member and said inner telescoping member are cylindrical.

5. The towing device support of claim 4 further comprising aligning means for preventing rotation of said outer telescoping member relative to said inner telescoping member.

6. The towing device support of claim 5, wherein said inner telescoping member has a slot, and wherein said aligning means comprises a pin, fixed to said outer telescoping member and protruding into an interior cavity thereof, and said slot, wherein said inner telescoping member is radially positioned so that said pin is positioned within said slot so that radial rotation of said outer telescoping member, relative to said inner telescoping member, is prohibited.

7. The towing device support of claim 1 further comprising a stop means for preventing separation of said outer telescoping member from said inner telescoping member.

8. The towing device support of claim 7, wherein said inner telescoping member has a slot, and wherein said stop means comprises a pin, fixed to said outer telescoping member and protruding into an interior cavity thereof, and said slot, said slot stopping short of said inner engaged end of said inner telescoping member, wherein said inner telescoping member is positioned so that said pin is positioned within said slot so as to prevent separation of the outer telescoping member from said inner telescoping member.

9. The towing device support of claim 1, wherein said outer telescoping member has an access hole, and wherein said securing means comprises:
   (a) a plurality of dimples formed upon an outer surface of said inner telescoping member, aligned along the longitudinal axis of said inner telescoping member, said dimples having a stopping surface and a sliding surface;
   (b) a midmount, attached to an outer surface of said outer telescoping member; and
   (c) a securing arm, rotatably mounted upon said midmount, said securing arm comprising a stopping portion, wherein said stopping portion engages said stopping surface of said dimples through said access hole, preventing expansion of the distance between said free ends.

10. The towing device support of claim 9 further comprising a second biasing means urging said stopping portion of said securing arm into engagement with said stopping surfaces of said dimples.

11. The towing device support of claim 1 wherein said first connecting means comprises a plate, suitable for connection to said towing device, and an endmount comprising a baseplate, rotatably secured to said plate, and two perpendicular flanges, attached to said baseplate, said two perpendicular flanges surrounding one of said free ends of said telescoping assembly and rotatably connected thereto.

* * * * *